United States Patent [19]

Morse et al.

[11] Patent Number: 4,926,578
[45] Date of Patent: May 22, 1990

[54] FISHING LURE

[76] Inventors: James D. Morse, 210 Hunt's Neck Rd., Poquoson, Va. 23662; Daniel C. Morris, II, 1733 Old Buckingham Rd., Hampton, Va. 23669

[21] Appl. No.: 279,927

[22] Filed: Dec. 5, 1988

[51] Int. Cl.⁵ ............................................. A01K 85/00
[52] U.S. Cl. ................................. 43/42.24; 43/42.26; 43/42.39; 43/42.28
[58] Field of Search ................. 43/42.24, 42.26, 42.25, 43/42.27, 42.28, 42.22, 42.23, 42.36, 42.37, 42.38, 42.39

[56] References Cited

U.S. PATENT DOCUMENTS

| | | | |
|---|---|---|---|
| D. 248,868 | 8/1978 | Williams | 22/27 |
| D. 259,504 | 6/1981 | Lott | 22/27 |
| D. 269,366 | 6/1983 | Ward | 22/27 |
| D. 270,749 | 9/1983 | Gowing et al. | 22/27 |
| D. 270,750 | 9/1983 | Zaffis | 22/27 |
| D. 288,347 | 2/1987 | Lumsden | 22/27 |
| 3,922,811 | 12/1975 | Ellingson | 43/42.39 |
| 3,940,869 | 3/1976 | Roberts | 43/42.24 |
| 4,138,792 | 2/1979 | Hill | 43/42.24 |
| 4,177,597 | 12/1979 | Thomassin | 43/42.3 |
| 4,219,956 | 9/1980 | Hedman | 43/42.1 |
| 4,592,161 | 6/1986 | Smith et al. | 43/42.24 |

Primary Examiner—Richard K. Seidel
Assistant Examiner—Mike Starkweather
Attorney, Agent, or Firm—Robbins & Robbins

[57] ABSTRACT

A fishing lure having a V-shaped body, wings, tail and a hook designed to glide very slowly to the bottom of the water resembling an injured bait fish. The body and wings allow the lure to glide through the water, and the hook, acting as a keel, and the tail stabilize the lure to keep it from rolling and adds vibration to the lure as it descends through the water. The lure also has a weedless quality in that its flat design allows it to slide over thick weeds, lily pads or brush.

7 Claims, 2 Drawing Sheets

FISHING LURE

BACKGROUND OF THE INVENTION

There exist many fishing lures of all types by which the fisherman hopes to increase his chances at success. Obviously, it is important to use a lure which approximates the food source of the targeted fish. Therefore, not only must the lure appear life-like, it must also possess the characteristic motions of the bait. Small bait fish are a popular choice to attract larger fish. The larger fish are especially attracted to the gliding, slowly descending movements of injured bait fish. Thus, it is desirable to have a lure which will exhibit these traits as it is being drawn through the water.

Another important consideration in developing lures is constructing the lures so that they do not get so easily tangled up in weeds or brush, where fish generally feed and hide. A streamlined lure whose hook barb is disposed within the body of the lure will be able to slide over any obstacles and avoid being snagged.

SUMMARY OF THE INVENTION

By means of this invention there has been provided a fishing lure of soft plastic, which consists of a substantially V-shaped body, lateral wings, a long curling tail receiving a hook whose barb is embedded in the body of the lure and whose shank is disposed underneath the body of the lure to serve as a keel. The body and wings enable the lure to glide through the water, while the tail stabilizes the lure body to prevent it from rolling about its longitudinal axis. The tail also imparts a vibrating motion to the lure as it descends through the water. The keel aspect of the hook shank extending through the underlying rib provides for greater stability and balance of the lure.

The lure design of the instant invention enables a very slowly gliding descent to the bottom of the water resembling an injured bait fish, as opposed to the more conventional plastic worms on the market which sink straight to the bottom.

The flat design of the lure and embedded hook allow it to slide over thick weeds, lily pads or brush. This enables the fisherman to manipulate the lure and direct it to the exact spot he wants, such as into open pockets of weeds, lily pads or brush. Once in these pockets, the lure may then fall with its characteristic bait fish movements.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
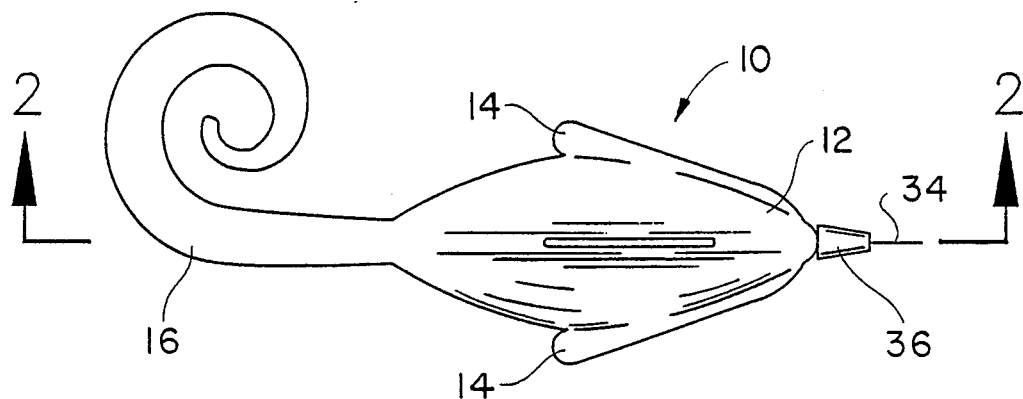
FIG. 1 is a bottom plan view of the lure attached to a hook, line and sinker.
Figure 4:
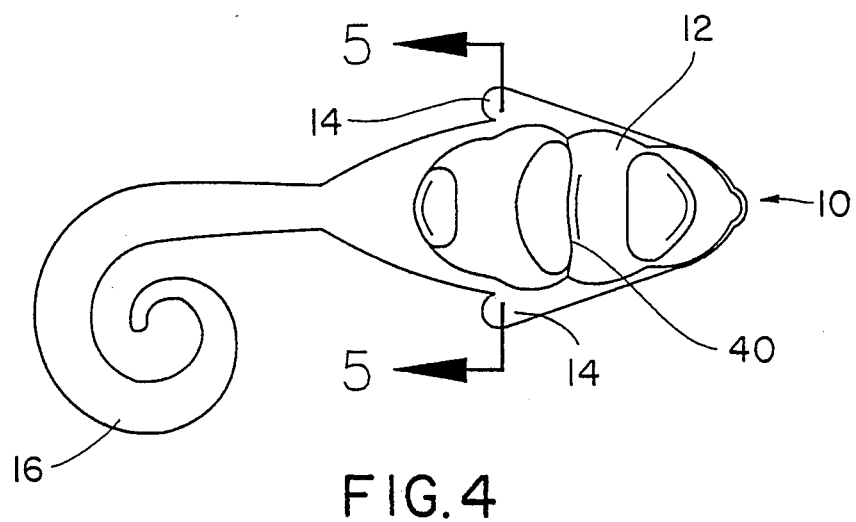
FIG. 4 is a top plan view of the lure.
Figure 6:
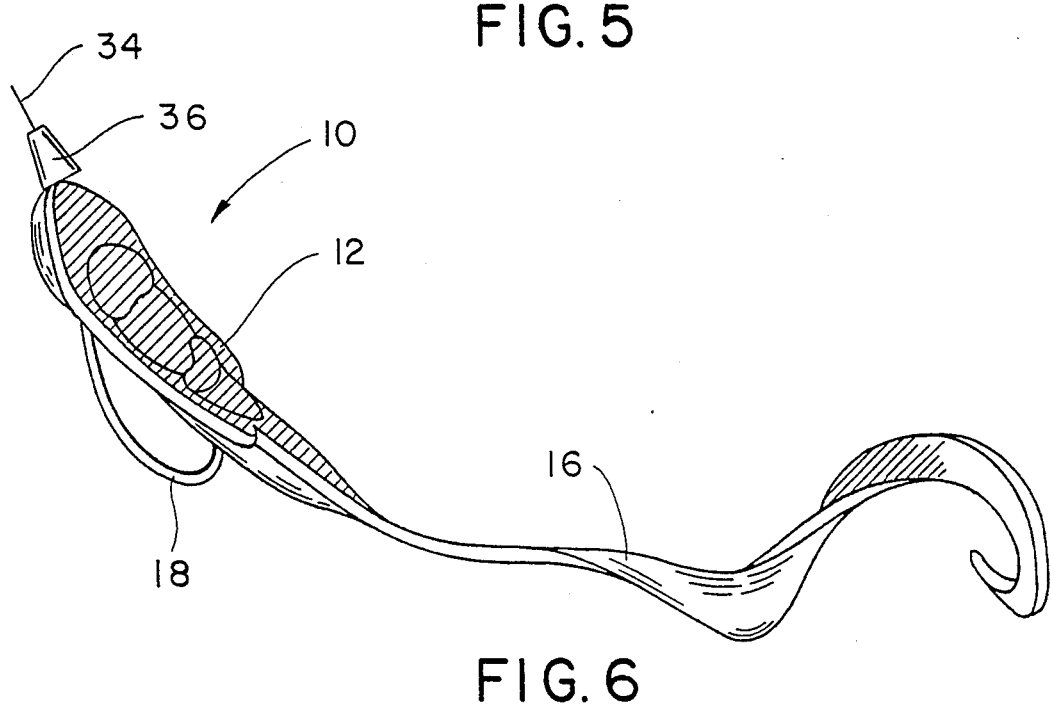
FIG. 6 is an enlarged pictorial view of the lure attached to a hook, line and sinker.

The fishing lure of this invention is generally indicated by the reference numeral 10 in FIGS. 1, 4 and 6. It is comprised of a soft plastic body 12 approximating a substantially V-shape, two wings 14 extending from said body, a tail 16 and a fish hook 18 embedded in body 12.

The soft plastic body 12 may be made in conventional fashion by molding a soft yieldable flexible synethetic rubber or plastic composition as is well known in the art. The tail 16 trails behind the body 12 and is molded so as to incorporate an inward-spiralling shape. The tail 16 is substantially longer than body 12 and extends out as the lure is pulled through the water as shown in FIG. 6. The long, spiral tail helps to stabilize lure 10 during its movement through the water.

Figure 2:
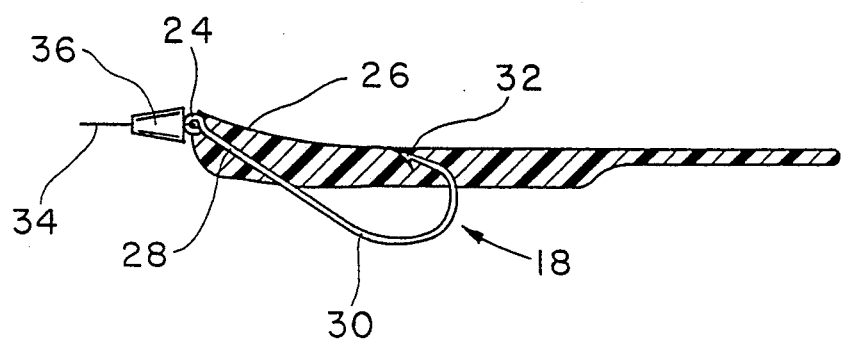
FIG. 2 is a view in section taken on the line 2—2 of FIG. 1.
Figure 3:
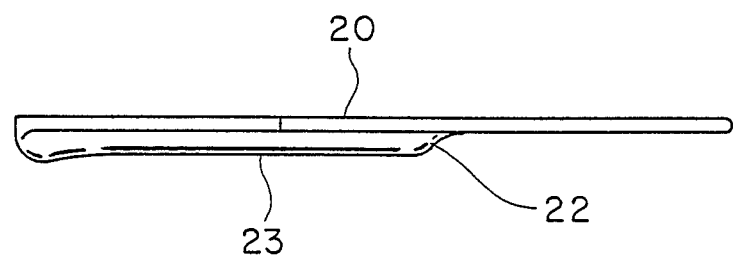
FIG. 3 is a view in side elevation of the lure taken from the right side of FIG. 1.
Figure 5:
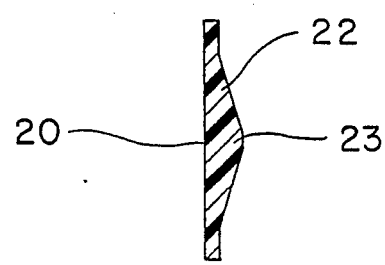
FIG. 5 is a view in section taken on line 5—5 of FIG. 4.

The body 12 of the lure has a flat top side 20 and a convex, substantially V-shaped bottom side 22 best shown in FIGS. 2, 3 and 5. The apex or center of the bottom side includes a thickened, longitudinally extending rib 23 which receives a barb of a hook. Flat side 20 may incorporate markings 40 to approximate the colorations and markings of a typical bait fish as shown in FIG. 4.

The colorations and markings are incorporated in situ into the plastic body during the molding process. The lure body is conventionally made by pouring hot liquid worm plastic into the mold. While the worm plastic, which has a base color, is still hot, three drops of a different color worm plastic are poured on top of the base color worm plastic. When the plastic cools, the spots from the different colors blend together resulting in a crawfish, or other bait, body appearance.

Hook 18 is embedded in body 12 such that the hook eye 24 emerges from the front tip 26 of body 12 with the front portion of the hook shank 28 embedded in the front tip 26 of body 12 as best shown in FIG. 2. The rear, curved hook shank portion 30 emerges from body 12 and is disposed over the convex side 22 of the lure. The barb 32 of hook 18 is embedded in body 12 just beneath the rib 23 and the surface of flat side 20 of the lure as best shown in FIG. 2. The hook 18 may be easily removed and repositioned due to the nature of the soft plastic body 12. Because the barb 32 is not exposed, the lure 10 may be dragged over weeds, brush, logs and the like without being snagged. Hook eye 24 permits the lure 10 to receive a fishing line 34. A sliding sinker weight 36 may be employed on the line 34 as desired.

USE

The V-shaped soft plastic lure of this invention is made by pouring hot liquid worm plastic or flexible synthetic rubber or the like into a mold. Markings and other characteristics may be made on the lure body to give the lure a life-like quality and approximate the appearance of various bait fish.

The body 12 and wings 14 cause the lure to glide through the water while the tail 16 stabilizes the lure to keep it from rolling. Because of this design the lure glides to the bottom very flowly, resembling an injured bait fish. Tail 16 also imparts a certain vibration to the lure as it falls through the water. The hook 18 and rib 23 are used as a keel for further stabilization of the lure.

The bottom side 22 with rib 23 and the hook shank acting as a keel and the flat top side 20 allow the lure to slide over thick weeds, lily pads or brush and the like. Thus, the lure may be cast into weeds and reeled into an open pocket amongst the weeds where it may dro and fall to the bottom of the water. A weedless quality is further imparted to the lure due to the barb 32 of hook 18 being embedded inbody 12 so as to not snag.

The lure of this invention may be made in different sizes corresponding to the various types of bait fish.

Various changes and modifications may be made within this invention as will be apparent to those skilled in the art. Such changes and modifications are within the scope and teachin of this invention as defined in the claims appended hereto.

What is claimed is:

1. A soft plastic body fishing lure comprising:
   (a) a body having a front, rear, top, bottom, first side and second side portions;
   (i) said top portion being substantially flat;
   (ii) said bottom portion
   having said first and second side portions being flat and parallel with said top portion, and further having a V-shaped keel portion, having an apex, where the apex corresponds to said bottom portion's midpoint, and said keel connects said side portions, said keel running the length of said body;
   (iii) said body, as viewed from the top, having an oval shape where said front and rear portions correspond to the ends of aid oval, and further having wings attached to said first and second side portions, said wings beginning at said front portion, extending along the sides of said oval and ending approximately midway between said front and rear portions;
   (b) a tail portion substantially longer than said body, attached to said body's rear portion having a uniform thickness where the tail's top and bottom extend from said flat top portion and said flat bottom portions respectively, said tail further having a spirally wound shape; and
   (c) a fish hook removably embedded in said body.

2. The fishing lure of claim 1 in which said fish hook has an end portion of its shank embedded in the front portion of said body, a substantial portion of said shank disposed axially below said keel portion of said body and the barb end of said hook is embedded in said body above said keel portion.

3. The fishing lure of claim 2 in which said hook acts with the bottom keel portion of said body as a keel to stabilize said lure from excessive motion about its longitudinal axis as said lure is drawn through the water.

4. The fishing lure of claim 2 in which said hook has its barb end embedded in said body whereby said lure may be drawn over weeds and brush without said hook being snagged.

5. The fishing lure of claim 2 in which said body is resilient to allow said hook to move through said body upon the exertion of an external force.

6. The fishing lure of claim 5 in which said hook may be withdrawn and repositioned within said body.

7. The fishing lure of claim 1 in which said body has different colored markings simulating a bait body, said markings being obtained by incorporating different colored worm plastic into said body in situ.

* * * * *